UNITED STATES PATENT OFFICE.

MAX BOCKMÜHL AND KURT WINDISCH, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

METHYL SULPHITES OF SECONDARY AROMATIC ALIPHATIC AMINES AND PROCESS OF MAKING SAME.

1,426,348.      Specification of Letters Patent.      Patented Aug. 22, 1922.

No Drawing.      Application filed July 16, 1921. Serial No. 485,403.

*To all whom it may concern:*

Be it known that we, MAX BOCKMÜHL and KURT WINDISCH, citizens of Germany, residing at Hochst-on-the-Main, Germany, have invented certain new and useful Improvements in Methyl Sulphites of Secondary Aromatic Aliphatic Amines and Processes of Making Same (for which I have made application in Germany May 31, 1920), of which the following is a specification.

According to our present invention there are made methylsulphites of secondary aromatic-aliphatic amines which have a considerably greater antipyretic efficiency than that of the methylsulphites of primary aromatic amines. This therapeutic action appears to be associated with a more complex composition than that of the known methylbisulphites of methylaniline, ethylaniline and benzylaniline, since these bodies do not exhibit the action to an appreciable extent.

The process consists in condensing secondary aromatic-aliphatic amines of the formula

wherein R stands for a substituted aromatic residue and $R_1$ stands for an aliphatic residue, with formaldehydebisulphite. The products readily dissolve in water and are decomposed by addition of acids.

The following examples illustrate our invention, the parts being by weight:—

1. *Manufacture of sodium N-methyl-p-phenetidine-methylsulphite.*

8, 2 parts of a formaldehyde solution of 36,6 per cent strength, 26 parts of a solution of sodium bisulphite of 40 per cent strength, 15 parts of N-methylphenetidine and 25 parts of alcohol are heated together to boiling; a homogeneous solution is obtained from which the product of the reaction separates. This product is filtered and is redissolved in dilute alcohol. The substance obtained decomposes at 265° C. It readily dissolves in water and is distinguished from the compound described in German specification No. 209,695 by the following reaction:—The addition of hydrochloric acid to its aqueous solution does not cause precipitation of an organic acid. If nitrite is then added the substance assumes a blood-red coloration and an oil separates.

2. *Manufacture of sodium N-ethyl-p-phenetidine methylsulphite.*

24,6 parts of a formaldehyde solution of 36,6 per cent strength, 78 parts of a solution of sodium bisulphite of 40 per cent strength and 49 parts of ethyl phenetidine are stirred together for some hours at 25–30° C. until a homogeneous solution is obtained. The minor part of the product of the reaction crystallises during the night, whilst the remaining part is obtained by concentrating the mother liquor. The salt is redissolved in alcohol; the temperature at which it decomposes is not sharply defined. The new compound possesses the same properties as those of the methyl compound obtainable as described in Example 1.

3. *Preparation of sodium 1-phenyl-2.3-dimethyl-5-pyrazolone-4-ethylamino-methylsulphite.*

There are introduced into 23 parts of ethylamino-antipyrine a still hot solution obtained by the reaction of 8,2 parts of formaldehyde of 36,6 per cent strength with 26 parts of sodium bisulphite of 40 per cent strength, and the whole is stirred. After a short time a clear solution is obtained. This solution is concentrated, preferably in a vacuum, until the water is removed and the residue is redissolved in aqueous acetone. The substance melts in its water of crystallization between 80 and 90° C. and is very readily soluble in water. On heating it with dilute hydrochloric acid, sulphurous acid is eliminated.

Having now described our invention what we claim is:

1. As a new process, the manufacture of compounds of the general formula:

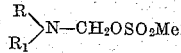

wherein R stands for a substituted aromatic residue, $R_1$ for an aliphatic residue, and Me for any alkali metal including ammonium, by condensing with formaldehyde bisulphites secondary aromatic aliphatic amines of the general formula:

$$R_1 \!\!\diagdown\!\!\!\!\!\!{}_{R}\!\!\!\diagup\!\! N\!\!-\!\!H$$

wherein R stands for a substituted aromatic residue and $R_1$ for an aliphatic residue.

2. As a new products, the bodies of the general formula:

$$R_1 \!\!\diagdown\!\!\!\!\!\!{}_{R}\!\!\!\diagup\!\! N\!\!-\!\!CH_2OSO_2Me$$

wherein R stands for a substituted aromatic residue, $R_1$ for an aliphatic residue, and Me for any alkali metal including ammonium, being solid compounds which dissolve in water and decompose on addition of an acid and which have preeminent antipyretic efficiency.

In testimony whereof, we affix our signatures.

Dr. MAX BOCKMÜHL.
Dr. KURT WINDISCH.